(12) United States Patent
Khan et al.

(10) Patent No.: US 8,406,138 B2
(45) Date of Patent: Mar. 26, 2013

(54) WIRELESS COMMUNICATION TERMINAL AND QOS INFORMATION COLLECTION METHOD

(75) Inventors: Ashiq Khan, Yokosuka (JP); Toshihiro Suzuki, Yokohama (JP); Motonari Kobayashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1305 days.

(21) Appl. No.: 11/512,210

(22) Filed: Aug. 30, 2006

(65) Prior Publication Data

US 2007/0053299 A1    Mar. 8, 2007

(30) Foreign Application Priority Data

Sep. 2, 2005    (JP) ................ P2005-255329

(51) Int. Cl.
*H04J 3/14* (2006.01)
(52) U.S. Cl. ...................... 370/238
(58) Field of Classification Search ............ 370/237, 370/238, 395.21
See application file for complete search history.

(56) References Cited

U.S. PATENT DOCUMENTS

| 6,751,196 | B1 * | 6/2004 | Hulyalkar et al. | 370/252 |
| 7,321,587 | B2 * | 1/2008 | Gao et al. | 370/388 |
| 2001/0032272 | A1 * | 10/2001 | Fujita | 709/241 |
| 2003/0202468 | A1 * | 10/2003 | Cain et al. | 370/229 |
| 2003/0204616 | A1 | 10/2003 | Billhartz et al. | |
| 2004/0213198 | A1 * | 10/2004 | Mahmood et al. | 370/349 |
| 2004/0252694 | A1 * | 12/2004 | Adhikari et al. | 370/395.2 |
| 2006/0268749 | A1 * | 11/2006 | Rahman et al. | 370/256 |

FOREIGN PATENT DOCUMENTS

| EP | 1 458 148 A1 | 9/2004 |
| JP | 2005-524311 | 8/2005 |
| WO | WO 02/078272 A1 | 10/2002 |
| WO | WO 03/093926 A2 | 11/2003 |

OTHER PUBLICATIONS

William S. Hortos, "Analysis of Location-Aware QoS-Routing Protocols Based on Partial Temporal and Spatial Topology for Real-Time Multimedia in Mobile Ad Hoc Networks", Digital Wireless Communications, XP-002413819, Proc. of SPIE vol. 5440, 2004, pp. 107-125.
T. Clausen et al., "Optimized Link State Routing Protocol (OLSR)", Network Working Group Request for Comments: 3626, Oct. 2003, pp. 1-68 http://ftp.jaist.ac.jp/pub/Internet/RFC.pdf/rfc3626.txt.pdf.

(Continued)

*Primary Examiner* — Mark Rinehart
*Assistant Examiner* — Mohammad Anwar
(74) *Attorney, Agent, or Firm* — Oblon, Spivak, McClelland, Maier & Neustadt, L.L.P.

(57) ABSTRACT

In a wireless communication terminal, the other terminal existence confirmation section broadcasts a confirmation message at fixed intervals and receives a response message. The topology information management section computes the topology of the whole network to which the wireless communication terminal itself belongs, on the basis of the topology information on the network received at fixed intervals from other terminals. The path management section derives an optimum path to the terminal of the transmission destination. The QoS information collection section issues a communication start request instruction and, when a QoS information collect request instruction has been issued, unicasts a QoS request packet on the path and receives a reply QoS request packet. The judgment section adopts the path as the communication path when QoS information satisfies a predetermined quality standard.

10 Claims, 8 Drawing Sheets

OTHER PUBLICATIONS

Hakim Badis, et al., "QoS for Ad hoc Networking Based on Multiple Metrics: Bandwidth and Delay", 5$^{th}$ IFIP TC6 International Conference on Mobile and Wireless Communication Networks (MWCN'O3), IEEE, Singapore, Oct. 2003, 4 Pages.

Ying Ge, et al., "Quality of Service Routing in Ad-Hoc Networks Using OLSR", 36$^{th}$ Hawaii International Conference on System Sciences (HICSS'03), IEEE, 2003, 9 Pages.

R. Ogier, et al., "Topology Dissemination Based on Reverse-Path Forwarding (TBRPF)", Network Working Group Request for Comments: 3684, Feb. 2004, pp. 1-46 http://ftp.jaist.ac.jp/pub/Internet/RFC.pdf/rfc3684.txt.pdf.

Masakatsu Kosuge, et al, "Ad hoc Networks A New Frontier [First Part]", Journal of Information Processing Society of Japan, Issue 44, vol. 10, Oct. 15, 2003, pp. 1052-1055 (with English translation).

Norihiro Fukumoto, et al., "A Quality Control Mechanism for Multimedia Streams based on the Multi-RTCP Scheme for QoS Reporting over Wireless IP-Based Networks", The Institute of Electronics, Information and Communication Engineers, IEICE Technical Report IN2004-221, vol. 104, No. 691, Feb. 24, 2005, pp. 125-130.

\* cited by examiner

| TRANSMISSION DESTINATION | Next hop |
|---|---|
| I | B |
| H | C |
| ⋮ | ⋮ |

*Fig.4*

| TRANSMISSION DESTINATION | TRANSMISSION SOURCE | QoS TERM (1) | ... | QoS TERM (n) |
|---|---|---|---|---|

Fig.5

| TRANSMISSION DESTINATION | TRANSMISSION SOURCE | LINK (1) QoS TERM (1) | ... | LINK (m) QoS TERM (1) | ... | LINK (1) QoS TERM (n) | ... | LINK (m) QoS TERM (n) |

| TRANSMISSION DESTINATION | Next hop(1) | Next hop(2) | Next hop(3) | ... |
|---|---|---|---|---|
| F | C | B | D | |
| G | D | C | B | |
| ... | ... | ... | ... | ... |

WIRELESS COMMUNICATION TERMINAL AND QOS INFORMATION COLLECTION METHOD

CROSS-REFERENCE TO RELATED APPLICATIONS

This application is based upon and claims the benefit of priority from Japanese Application 2005-255329, filed Sep. 2, 2005.

BACKGROUND OF THE INVENTION

1. Field of the Invention

The present invention relates to a wireless communication terminal and QoS information collection method.

2. Related Background Art

An adhoc network is constituted by autonomous user terminals e.g., personal digital assistants (PDA), personal computers, wireless communication terminals such as cellular phones, and links among the respective wireless communication terminals. A base station, an access point and so forth that manages the wireless communication terminals does not exist in this adhoc network. Therefore, routing is required by each of the wireless communication terminals before starting communications. As a result of the routing, it is determined where the communication-destination wireless communication terminal is and which wireless communication terminal communications are to be routed through for communication with the terminal. The protocols for routing in such ad-hoc networks include the proactive-type routing protocol, for example.

In a proactive-type routing protocol, the respective wireless communication terminals have a routing table for storing path information to other wireless communication terminals on the network. Here, the path information stored in the routing table is found as follows, for example. First, the topology, which is the connection form of the network, is determined on the basis of topology information that is exchanged at fixed intervals between the respective wireless communication terminals. Path information to the other wireless communication terminals is then found on the basis of the topology. By using a routing table in which such path information is stored, the respective wireless communication terminals are always able to grasp the path to the respective transmission destinations irrespective of whether communication exists.

In an adhoc network of this kind, because the states of the links change at any time unlike a wired network, the communication quality such as the bandwidth and delay and so forth also accordingly changes at any time. Hence, in an adhoc network requiring a high communication quality, information on the existence of a link as well as link QoS (Quality of Service) information must be exchanged between the respective wireless communication terminals.

When QoS information is exchanged by using an proactive-type routing protocol, the topology information is exchanged at fixed intervals between the respective wireless communication terminals after the QoS information on the links has also been added to the information on the existence of links contained in the topology information (See Document 1: 'Hakim Badis, Anelise Munaretto, Khaldoun Al Agha and Guy Pujolle, "QoS for Ad-hoc Networking Based on Multiple Metrics: Bandwidth and Delay", In the Proceedings of the $5^{th}$ IFIP TC6 International Conference on Mobile and Wireless Communication Networks (MWCN'03), IEEE, Singapore, October 2003.' and Document 2 'Ying Ge, Thomas Kunz and Louise Lamont, "Quality of Service Routing in Ad-hoc Networks Using OLSR", in the Proceedings of the $36^{th}$ Hawaii International Conference on System Sciences (HICSS'03), IEEE, 2003.' As a result, a path to the transmission destination can be constructed by the respective wireless communication terminals and the quality of the path can be judged. Hence, when a plurality of paths to the transmission destination exist, communication can be performed by selecting the path with the optimum quality.

Further, when QoS information that uses the proactive-type routing protocol is exchanged, QoS information on the links is also added to the topology information exchanged at fixed intervals. Hence, the amount of consumption of terminal resources such as the CPU and memory and wireless resources such as the communication bandwidth increases and the load on the network increases.

SUMMARY OF THE INVENTION

Further, in order to determine the above problem, an object of the present invention is to provide a wireless communication terminal and QoS information collection method capable of reducing the amount of consumption of terminal resources and wireless resources in order to reduce the load on the network.

The wireless communication terminal of the present invention comprises other terminal existence confirmation means for confirming the existence of another wireless communication terminal that allows mutual direct wireless communication with the wireless communication terminal itself; topology information management means for managing information relating to the other wireless communication terminal confirmed by the other terminal existence confirmation means and information on the topology of the network that is received from the other wireless communication terminal; path derivation means for deriving the optimum path to the transmission destination on the basis of the topology information managed by the topology information management means; and QoS information collection means for collecting QoS (Quality of Service) information for at least a portion of the path when a collect request instruction requesting that QoS information on the path derived by the path derivation means be collected.

Further, the QoS information collection method of the present invention comprises an other terminal existence confirmation step in which the wireless communication terminal confirms the existence of another wireless communication terminal that allows mutual direct wireless communication with the wireless communication terminal itself; a topology information management step in which the wireless communication terminal manages information relating to the other wireless communication terminal confirmed by the other terminal existence confirmation step and information on the topology of the network that is received from the other wireless communication terminal; a path derivation step in which the wireless communication terminal derives the optimum path to the transmission destination on the basis of the topology information managed by the topology information management step; and a QoS information collection step in which the wireless communication terminal collects QoS information for at least a portion of the path when a collect request instruction requesting that QoS information on the path derived by the path derivation means be collected.

According to these inventions, another wireless communication terminal that allows mutual direct wireless communication with the wireless communication terminal itself is able to reliably grasp the existence of a so-called 'one hop neighbor' and receive topology information on the network from the one hop neighbor. Therefore, the connection form of the whole network can always be grasped. Furthermore, the optimum path to the transmission destination can be derived based on the received topology information. Hence, only the optimum path can be managed among the paths to the transmission destination. Further, only when a QoS information collect request instruction is received, QoS information on all or a portion of the paths can be collected. Hence, QoS information can be collected only when necessary. That is, according to the present invention, QoS information can be collected only on the required path only when necessary. In addition, not only the QoS information computation amounts of the respective communication terminals on the network, the QoS information exchange amounts and propagation amounts between the respective communication terminals can be suppressed, but also the amounts of consumption of the terminal resources and wireless resources and so forth can be reduced and the load on the network can be reduced.

In the case of the wireless communication terminal of the present invention, the QoS information collection means preferably collects the QoS information by transmitting packets in which at least QoS items which are collection targets are stored on a path derived by path derivation means and by receiving packets in which at least the QoS information corresponding with the QoS items are stored on the path. Thus, QoS information corresponding with the desired QoS items can be efficiently collected.

In the case of the wireless communication terminal of the present invention, the QoS information collected by the QoS information collection means desirably further comprises path adoption means that adopt a path corresponding to the QoS information when a predetermined quality standard is satisfied. Thus, a wireless communication environment that satisfies a predetermined quality standard can be provided.

According to the wireless communication terminal of the present invention, when a plurality of paths are derived by the path derivation means, the QoS information collection means preferably collects the respective QoS information on the plurality of paths. Thus, even in a case where communication is performed by using a plurality of paths, only the QoS information on the path required for communication can be collected.

The wireless communication terminal and QoS information collection method of the present invention make it possible to reduce the terminal resource and wireless resource consumption amounts and to reduce the load on the network.

DESCRIPTION OF THE PREFERRED EMBODIMENTS

An embodiment of the wireless communication terminal and QoS information collection method according to the present invention will now be described with reference to the drawings. Further, a repetitive description is avoided by assigning the same codes to the same elements in the respective drawings.

Figure 1:
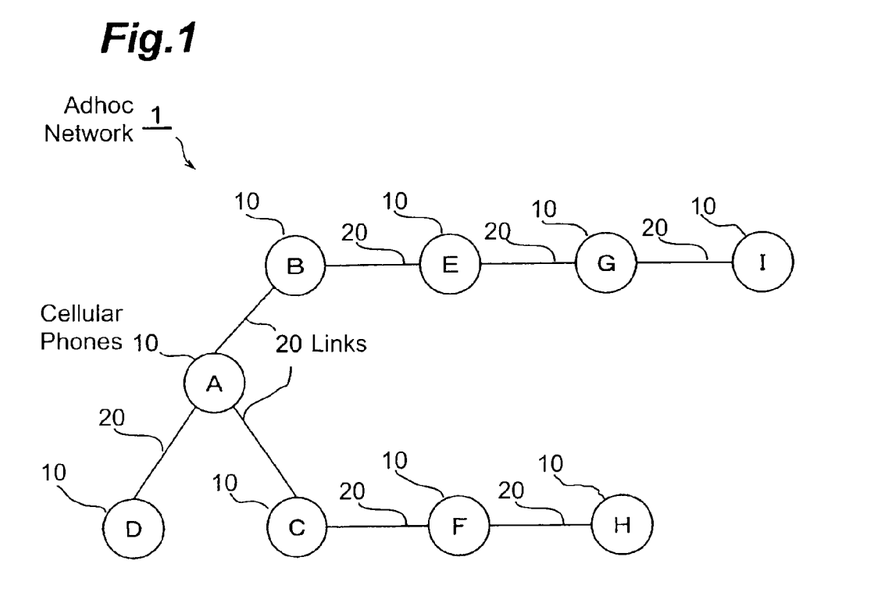
FIG. 1 illustrates the network configuration of an adhoc network of an embodiment.

FIG. 1 illustrates the constitution of the adhoc network 1 of this embodiment. As shown in FIG. 1, the adhoc network 1 comprises a cellular phone 10 constituting a node, and links 20 between the respective cellular phones 10. The links 20 are bidirectional links. The cellular phones 10 at both ends of the links 20 are able to perform direct wireless communication with one another. One link 20 is known as one hop and a cellular phone capable of performing direct wireless communication is known as a one hop neighbor. Cellular phones between which links 20 do not exist are unable to perform direct wireless communication.

Further, in this embodiment, a specific example of the wireless communication terminal will be described by using the cellular phone 10 but the specific example of the wireless communication terminal is not limited to the cellular phone 10. The wireless communication terminal may be a simple cellular phone (PHS), a mobile communication terminal such as a personal digital assistant (PDA) with a wireless communication function, a fixed communication terminal such as a personal computer with a wireless communication function, or an electronic device such as a printer with a wireless communication function, for example.

Figure 2:
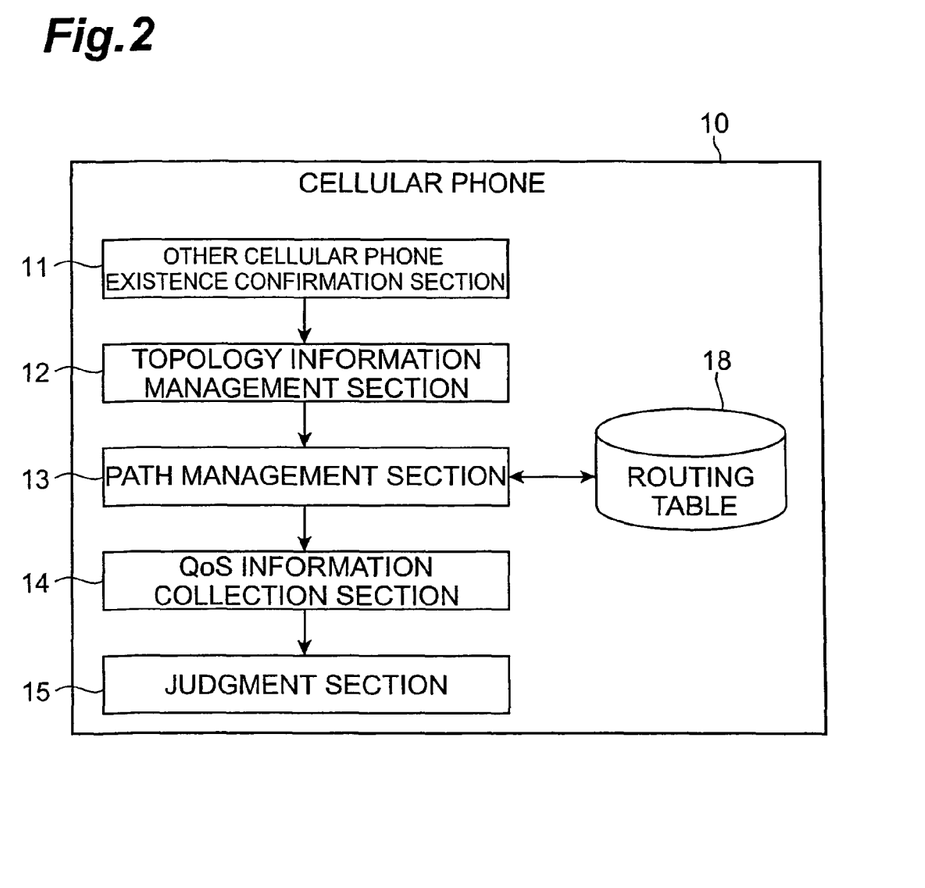
FIG. 2 is a block diagram that illustrates the functional constitution of the cellular phone shown in FIG. 1.

The functional constitution of the cellular phone 10 of this embodiment will be described next with reference to FIG. 2. As shown in FIG. 2, the cellular phone 10 comprises an other cellular phone existence confirmation section 11 (other terminal existence confirmation means), a topology information management section 12 (topology information management means), a path management section 13 (path derivation means), a QoS information collection section 14 (QoS information collection means), and a judgment section 15 (path adoption means).

The other cellular phone existence confirmation section 11 confirms the existence of another cellular phone that allows direct wireless communication to be performed mutually with the cellular phone 10 itself. When this is described in specific terms, the other cellular phone existence confirmation section 11 broadcasts a confirmation message to all the other cellular phones that exist in the periphery thereof at fixed intervals (every two seconds, for example). As a confirmation message, a HELLO Packet applies, for example. The other cellular phone existence confirmation section 11 receives a response message to the broadcast confirmation messages. The response message contains an ID for uniquely specifying the cellular phone that is the source of the response. As a result, the cellular phone 10 is able to confirm the existence of other cellular phones which are one hop neighbors. Further, the method and frequency at which a confirmation message and response message are exchanged is not limited to the above method and frequency. In short, as long as the existence of another cellular phone constituting a one hop neighbor can be confirmed, any method and frequency can be used. However, a change in one hop neighbors can be grasped more reliably by increasing the frequency and the amount of consumption of the terminal resources and wireless resources and so forth can be reduced further by reducing the frequency.

The topology information management section 12 computes the topology representing the connection form of the overall network to which its own cellular phone belongs on the basis of information relating to other cellular phones confirmed by the other cellular phone existence confirmation section 11 and topology information on the network that is received at fixed intervals from the other cellular phone, and stores the topology in memory. As information relating to the other cellular phones, the IDs of the other cellular phones apply, for example. As network topology information, one hop neighbor-related information on other cellular phones applies, for example. Thus, protocols for computing and managing the topology of the network while exchanging topology information at fixed intervals with other cellular phones include OLSR (Optimized Link State Routing Protocol) and TBRPF (Topology Dissemination Based on Reverse-Path Forwarding), for example.

Further, in the case of OLSR, Reference Document 1 (T. Clausen and P. Jacquet, "Optimized Link State Routing Protocol (OLSR)", RFC3626, October, 2003, http://ftp.jaist.ac.jp/pub/Internet/RFC.pdf/rfc3626.txt.pdf) was referenced and the content thereof was incorporated into the disclosed content of this specification. Further, with regard to TBRPF, Reference Document 2 (R. Ogier, F. Templin and M. Lewis "Topology Dissemination Based on Reverse-Path Forwarding (TBRPF)", RFC3684, February, 2004, http://ftp.jaist.ac.jp/pub/Internet/RFC.pdf/rfc3684.txt.pdf) was referenced and the content thereof was incorporated into the disclosed content of this specification.

The path management section 13 derives the optimum path to the cellular phone of the transmission destination on the basis of the topology computed by the topology information management section 12 and manages a routing table 18 on the basis of the derived path. When this is described in specific terms, the path management section 13 first derives the paths to the transmission destinations on the basis of the topology. The path management section 13 then selects the path with the smallest number of links to the transmission destination among the derived paths as the optimum path to the transmission destination. Thereafter, the path management section 13 creates or updates the routing table 18 on the basis of the selected optimum path.

Figure 3:
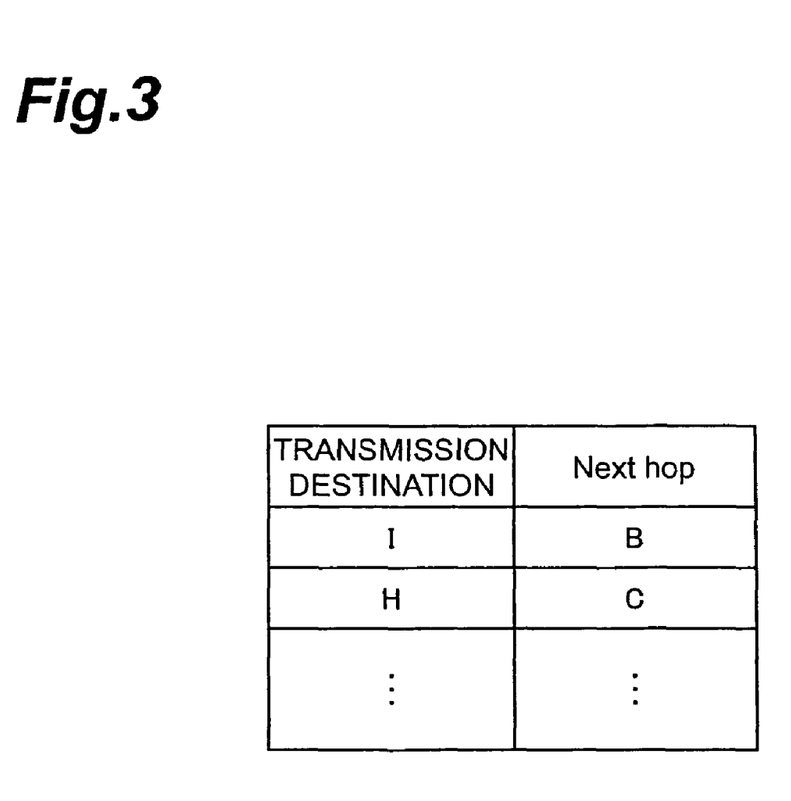
FIG. 3 illustrates the data constitution of the routing table.

Here, the table constitution of the routing table 18 will be described with reference to FIG. 3. The routing table 18 has 'Transmission destination' and 'Next hop', for example, as data items. An ID for uniquely specifying the cellular phone constituting the communication partner destination is stored for the transmission destination. An ID for uniquely specifying the cellular phones on the path constituting the transmission destination among the one hop neighbors is stored as the Next hop. That is, the ID of the cellular phone that the communication first passes through when communicating with the transmission destination among the cellular phones on the optimum path to the transmission destination is stored as the Next hop.

The path management section 13 updates information relating to the other cellular phones confirmed by the other cellular phone existence confirmation section 11 or updates the content of the routing table 18 when there is a change in the topology computed by the topology information management section 12. As a result, the routing table 18 is capable of storing the latest path information to the other cellular phones.

The QoS information collection section 14 receives a communication start request instruction that requests the start of communication and, when a collect request instruction that requests that QoS information on the path be collected is received, the QoS information collection section 14 collects QoS information on the path derived by the path management section 13. The communication start request instruction is an instruction that is output within the terminal as a result of the request for the application when the path to the communication partner destination used in data communication or control signal communication is required. The collect request instruction is an instruction that is output within the terminal together with the communication start request instruction.

The method of collecting QoS information will be described hereinbelow. First, the QoS information collection section 14 unicasts the QoS request packet shown in FIG. 4 on the path derived by the path management section 13.

Figure 4:
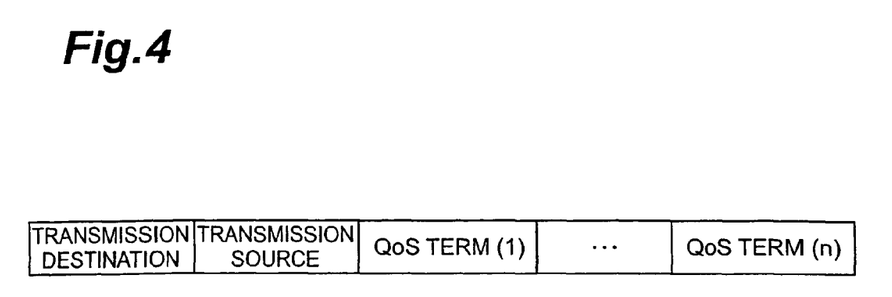
FIG. 4 illustrates the constitution of QoS request packet.

The address of the cellular phone of the transmission destination and the address of the cellular phone of the transmission source are stored in the QoS request packet shown in FIG. 4 and one or a plurality of QoS items which are collection targets are stored therein. QoS items include the bandwidth, delay, and link error rate, for example. The QoS items which are the collection targets are optionally set on the communication application side.

Thereafter, the respective cellular phones on the path whereon the QoS request packet is received store QoS information computed by the respective cellular phones in a predetermined storage location for QoS request packets.

Figure 5:
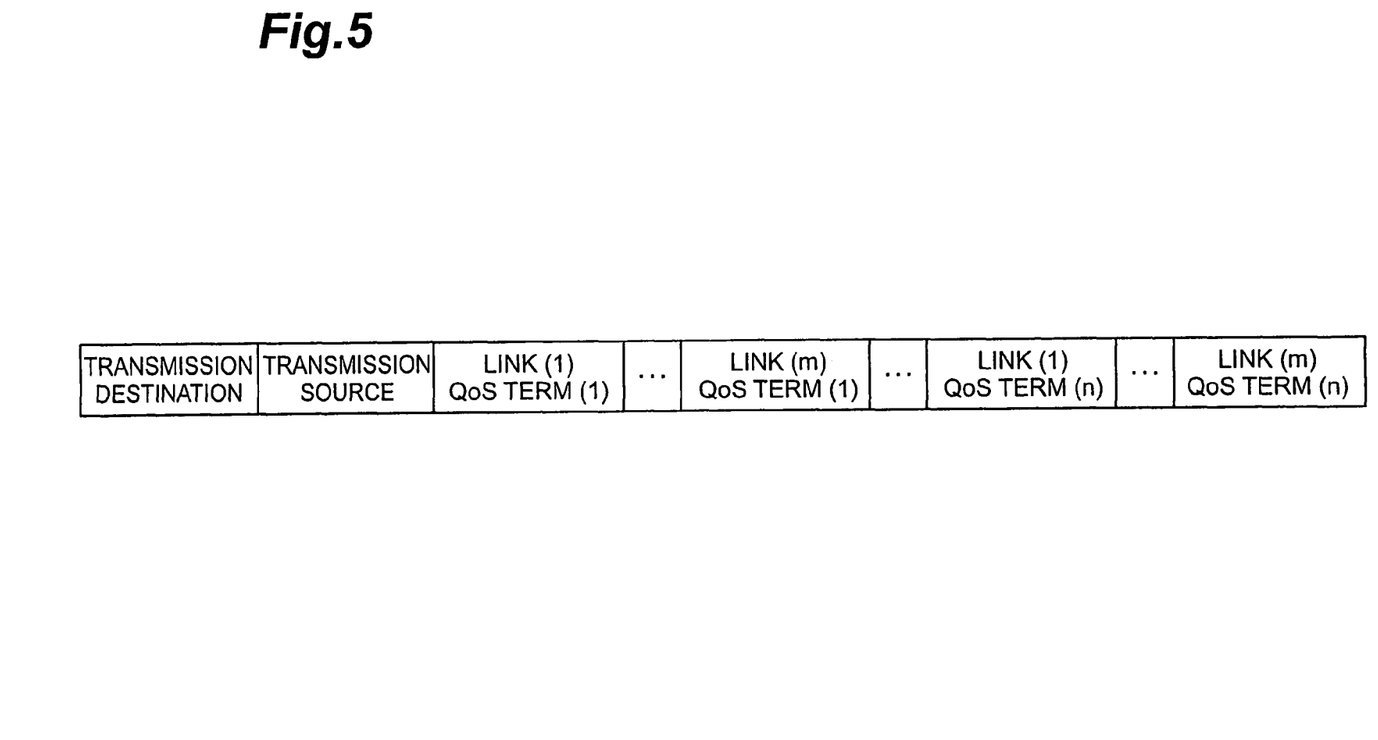
FIG. 5 illustrates the constitution of a response QoS request packet.

Thereafter, when the QoS request packet reaches the cellular phone which is the transmission destination, the reply QoS request packet shown in FIG. 5 is sent back to the cellular phone constituting the transmission source. The address of the transmission-destination cellular phone and the address of the transmission-source cellular phone are stored in the reply QoS request packet shown in FIG. 5 and QoS information corresponding with the QoS item of the respective links on the path are stored therein. Further, the address of the cellular phone constituting the transmission source of the QoS request packet and the address of the transmission-destination cellular phone are stored as the transmission source and transmission destination of the reply QoS request packet.

Thereafter, the reply QoS request packet is received by the transmission-source cellular phone. As a result, the transmission-source cellular phone is able to collect the QoS information on the path. QoS information corresponding with the desired QoS item can be collected efficiently by collecting QoS information by using such a QoS request packet.

The judgment section 15 judges whether the QoS information collected by the QoS information collection section 14 satisfies a predetermined quality standard. When it is judged that the QoS information satisfies the predetermined quality standard, the judgment section 15 adopts a path derived by the path management section 13 as the path used during communication. On the other hand, when the judgment section 15 judges that a predetermined quality standard has not been satisfied for Qos Information, the judgment section 15 sends a path request instruction requesting that another path be derived to the path management section 13. As a result, the user can be provided with a wireless communication environment that satisfies a predetermined quality standard.

Figure 6:
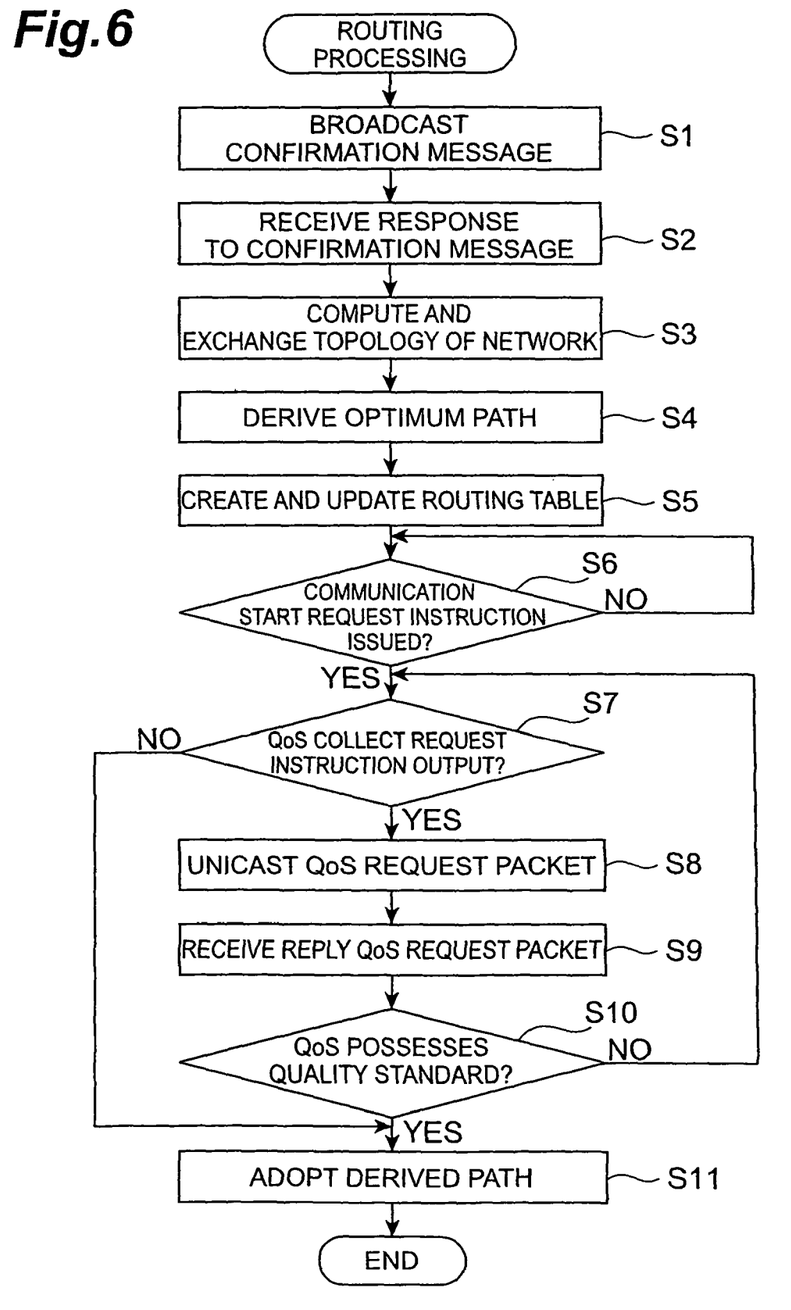
FIG. 6 is a flowchart that illustrates the flow of the routing processing.

The flow of the routing processing that includes the QoS collect processing that is performed by the cellular phone 10 of this embodiment will be described next with reference to FIG. 6.

First, the other cellular phone existence confirmation section 11 of the cellular phone 10 broadcasts a confirmation message at fixed intervals to all the other cellular phones that exist in the periphery thereof (step S1). The other cellular phone existence confirmation section 11 receives a response message in response to the broadcast confirmation message (step S2).

Thereafter, the topology information management section 12 computes and exchanges the topology representing the connection form of the whole network to which its own cellular phone belongs on the basis of information relating to other cellular phones confirmed by the other cellular phone existence confirmation section 11 and network topology information received at fixed intervals from the other cellular phones (step S3).

Thereafter, the path management section 13 derives the optimum path on the basis of the topology computed by the topology information management section 12 (step S4) and creates or updates the routing table 18 on the basis of the derived path (step S5).

The processing as far as steps S1 to S5 above is repeated irrespective of whether the processing described hereinbelow is executed.

Thereafter, when the path management section 13 has output a communication start request instruction requesting that communication be started (step S6; YES), the QoS information collection section 14 judges whether a collect request instruction requesting that QoS information on the path be collected has been output (step S7). When the judgment is NO (step S7; NO), the processing is moved to step S11 (described subsequently).

On the other hand, when it is judged in the judgment of step S7 that the collect request instruction has been output (step S7; YES), the QoS information collection section 14 unicasts a QoS request packet on the path derived by the path management section 13 (step S8).

Thereafter, the QoS information collection section 14 receives a reply QoS request packet in which QoS information is stored by the respective cellular phones on the path (step S9).

The judgment section 15 then judges whether the QoS information collected by the QoS information collection section 14 satisfies a predetermined quality standard (step S10).

When the judgment is NO (step S10; NO), the judgment section 15 sends a path request instruction requesting that another path be derived to the path management section 13 and moves the processing to step S7.

On the other hand, when it is judged in the judgment of step S10 that the QoS information satisfies the predetermined quality standard (step S10; YES), the judgment section 15 adopts the path derived by the path management section 13 as the communication path (step S11).

As mentioned earlier, the cellular phone 10 of this embodiment is able to reliably grasp the existence of another cellular phone that allows mutual direct wireless communication with the cellular phone 10 itself, that is, a so-called one hop neighbor, and is able to receive topology information on the network from the one hop neighbors. Hence, the connection form of the whole network can always be grasped. Further, the optimum path to the transmission destination can be derived on the basis of the received topology information. Therefore, only the optimum path among the paths to the transmission destination can be managed. In addition, the QoS information on the path can be collected only when a QoS information collect request instruction is output. Therefore, QoS information can be collected only when necessary. That is, the present invention allows QoS information on the optimum path, that is, only on the path stored in the routing table 18, to be collected only when necessary. Hence, not only can the QoS information computation amounts of the respective cellular phones 10 on the network and the QoS information exchange amounts and propagation amounts between the respective cellular phones 10 be suppressed but the amounts of consumption of the terminal resources and wireless resources and so forth can also be reduced and the load on the network can be reduced.

Figure 7:
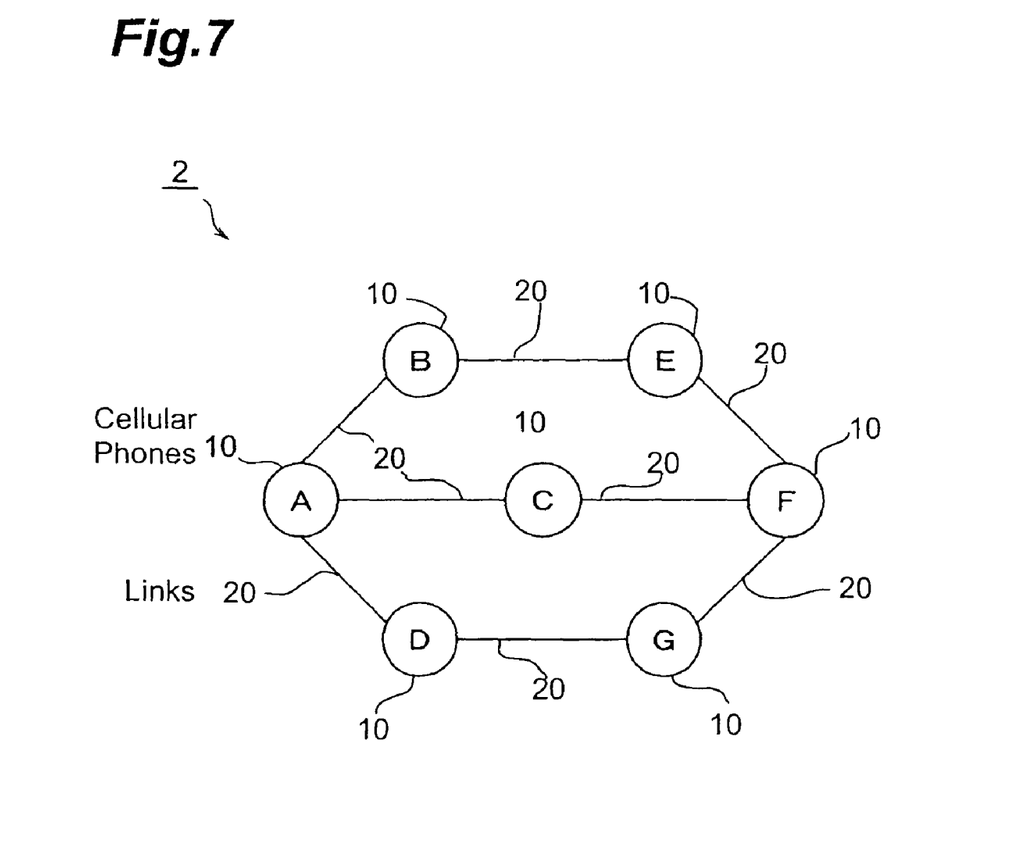
FIG. 7 illustrates the network configuration of the adhoc network of a modified example.
Figure 8:
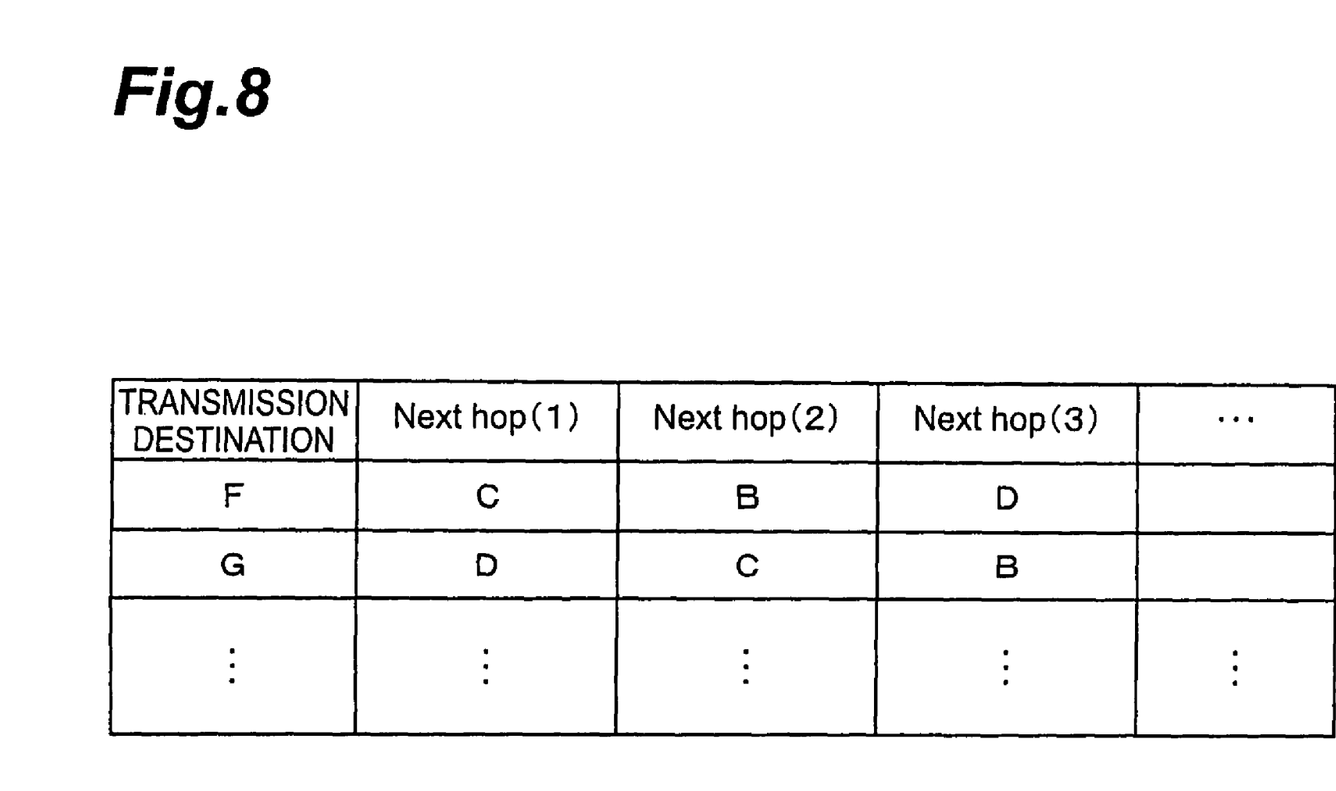
FIG. 8 illustrates the data configuration of a routing table of the modified example.

Further, although a case where there is one path to the transmission destination was described in the embodiment above, the present invention can also be applied to a case where there are a plurality of paths to the transmission destination. A case where there are a plurality of paths to the transmission destination will now be described with reference to FIGS. 7 and 8. FIG. 7 illustrates the constitution of an adhoc network 2 of this modified example. FIG. 8 illustrates the data constitution of the routing table of this modified example and illustrates the content of the routing table of the cellular phone "A" shown in FIG. 7. The path management section 13 of this modified example creates or updates the routing table as follows on the basis of the topology computed by the topology information management section 12. First, the path management section 13 derives the path to the transmission destinations on the basis of the topology. Thereafter, the path management section 13 selects, as optimum paths to the transmission destination, a plurality of paths within a predetermined specified number in order starting with the path with the smallest number of links to the transmission destination among the derived paths. The path management section 13 creates or updates the routing table on the basis of the respective selected paths. Here, the content of the routing table shown in FIG. 8 will be described. For example, it is shown that, when the transmission-destination cellular phone is "F", three paths which are a path in which a link between "A" and "C" is the Next hop, a path in which a link between "A" and "B" is the Next hop, and a path in which a link between "A" and "D" is the Next hop are derived as optimum paths from cellular phone "A" to cellular phone "F". In this case, the QoS information collection section 14 of this modified example collects QoS information on the three paths. Further, the judgment section 15 of the modified example judges whether the respective QoS information collected by the QoS information collection section 14 satisfies a predetermined quality standard. As a result, even when communication is performed by using a plurality of paths, only the QoS information on the paths required for communication can be collected.

In addition, the QoS information collection section 14 of the above embodiment collects QoS information on all the links on the path derived by the path management section 13 but is not limited to such QoS information. For example, only the QoS information on a portion of the links on the path derived by the path management section 13 may be collected. More specifically, for example, the collected QoS information is stored in memory and the QoS information may be collected only for the links for which QoS information has not been stored in memory. As a result, the terminal resource and wireless resource consumption amounts and the load on the network can be reduced.

Furthermore, the judgment section 15 of the embodiment above sends a path request instruction requesting that another path be derived to the path management section 13 upon judging that the QoS information does not satisfy a predetermined quality standard but is not limited to such an action. For example, when it is judged that the QoS information does not satisfy the predetermined quality standard, the judgment section 15 may reduce the level of the quality standard and, once again, judge whether the QoS information satisfies the predetermined quality standard.

The disclosure of Japanese Patent Application No. 2005-255329 filed Sep. 2, 2005 including specification, drawings and claims is incorporated herein by reference in its entirety.

What is claimed is:

1. A wireless communication terminal, comprising:
 other terminal existence confirmation means for confirming existence of another wireless communication terminal that allows mutual direct wireless communication with the wireless communication terminal itself;

topology information management means for managing information relating to the other wireless communication terminal confirmed by the other terminal existence confirmation means and information on topology of a network that is received from the other wireless communication terminal;

path derivation means for deriving an optimum path to a transmission destination on the basis of the topology information managed by the topology information management means; and quality of service (QoS) information collection means for transmitting, only upon reception of a QoS collection request instruction after the optimum path is derived by the path derivation means, a QoS request packet that only traverses each terminal included in the optimum path derived by the path derivation means to collect QoS information for at least a portion of the optimum path derived by the path derivation means, wherein the QoS information collection means collects the QoS information for at least the portion of the optimum path by transmitting the QoS request packet, upon determination in which at least a predetermined QoS item constituting a collection target is stored on the optimum path derived by the path derivation means and by receiving, from the optimum path, a packet in which at least QoS information corresponding with the predetermined QoS item is stored.

2. The wireless communication terminal according to claim 1, further comprising:

path adoption means for adopting a path corresponding with the QoS information when the QoS information collected by the QoS information collection means satisfies a predetermined quality standard.

3. The wireless communication terminal according to claim 1, wherein the QoS information collection means collects respective QoS information on a plurality of paths when the plurality of paths are derived by the path derivation means.

4. The wireless communication terminal according to claim 1, wherein the QoS information collection means collects QoS information for only a portion of the optimum path derived by the path derivation means.

5. A quality of service (QoS) information collection method, comprising:

confirming, through a wireless communication terminal, existence of another wireless communication terminal that allows mutual direct wireless communication with the wireless communication terminal itself;

managing, in the wireless communication terminal, information relating to the other wireless communication terminal confirmed in the confirming step and managing information on topology of a network that is received from the other wireless communication terminal;

deriving, in the wireless communication terminal, an optimum path to a transmission destination on the basis of the topology information managed in the managing the topology information; and transmitting, in the wireless communication terminal only upon reception of a QoS collection request instruction after the optimum path is derived, a QoS request packet that only traverses each terminal included in the optimum path derived in the wireless communication terminal to collect QoS information for at least a portion of the optimum path derived in the wireless communication terminal, wherein the QoS information is collected for at least the portion of the optimum path by transmitting the QoS request packet in which at least a predetermined QoS item constituting a collection target is stored on the optimum path derived by the path derivation means and by receiving, from the optimum path, a packet in which at least QoS information corresponding with the predetermined QoS item is stored.

6. The QoS information collection method according to claim 5, wherein the collecting QoS information includes collecting QoS information for only a portion of the optimum path derived by the path derivation means.

7. A wireless communication terminal, comprising:

an other terminal existence confirmation section configured to confirm existence of another wireless communication terminal that allows mutual direct wireless communication with the wireless communication terminal itself;

a topology information management section configured to manage information relating to the other wireless communication terminal confirmed by the other terminal existence confirmation section and information on topology of a network that is received from the other wireless communication terminal;

a path derivation section configured to derive an optimum path to a transmission destination on the basis of the topology information managed by the topology information management section; and a quality of service (QoS) information collection section configured to, only upon reception of a QoS collection request instruction after the optimum path is derived by the path derivation section, transmit a QoS packet that only traverses each terminal included in the optimum path derived by the path derivation section to collect QoS information for at least a portion of the optimum path derived by the path derivation section when a collect request instruction requesting that QoS information on the path derived by the path derivation section be collected is issued, wherein the QoS information collection section collects the QoS information for at least the portion of the optimum path by transmitting the QoS request packet in which at least a predetermined QoS item constituting a collection target is stored on the optimum path derived by the path derivation section and by receiving, from the optimum path, a packet in which at least QoS information corresponding with the predetermined QoS item is stored.

8. The wireless communication terminal according to claim 7, further comprising:

a path adoption section configured to adopt a path corresponding with the QoS information when the QoS information collected by the QoS information collection section satisfies a predetermined quality standard.

9. The wireless communication terminal according to claim 7, wherein the QoS information collection section collects respective QoS information on a plurality of paths when the plurality of paths are derived by the path derivation section.

10. The wireless communication terminal according to claim 7, wherein the QoS information collection section collects QoS information for only a portion of the optimum path derived by the path derivation section.

* * * * *